United States Patent [19]
Morita et al.

[11] Patent Number: 5,804,678
[45] Date of Patent: Sep. 8, 1998

[54] PROCESS FOR GAS PHASE POLYMERIZATION OF OLEFIN

[75] Inventors: Yoshinori Morita; Hiroshi Nishikawa; Yutaka Haneda; Satoru Ohtani; Kenji Doi, all of Waki-cho, Japan

[73] Assignee: Mitsui Petrochemical Industries, Ltd., Tokyo, Japan

[21] Appl. No.: 273,987

[22] Filed: Jul. 12, 1994

[30] Foreign Application Priority Data

Jul. 13, 1993 [JP] Japan .................................. 5-173010

[51] Int. Cl.$^6$ ....................................................... C08F 2/34
[52] U.S. Cl. .................. 526/80; 526/84; 526/88; 526/153; 526/160; 526/901; 526/943; 526/348.4; 526/348.5; 526/348.6; 502/114; 502/120
[58] Field of Search ................... 526/80, 84, 88, 526/153, 160, 901, 348.4, 348.5, 348.6, 943

[56] References Cited

U.S. PATENT DOCUMENTS

| | | | |
|---|---|---|---|
| 5,066,736 | 11/1991 | Dumain et al. | 526/84 |
| 5,218,071 | 6/1993 | Tsutsui et al. | 526/348 |
| 5,317,036 | 5/1994 | Brady, III et al. | 526/158 |
| 5,432,242 | 7/1995 | Baron | 526/84 |
| 5,525,678 | 6/1996 | Mink et al. | 526/92 |

FOREIGN PATENT DOCUMENTS

| | | |
|---|---|---|
| 0359444 | 3/1990 | European Pat. Off. . |
| 359444 | 3/1990 | European Pat. Off. . |
| 366823 | 5/1990 | European Pat. Off. . |
| 376559 | 7/1990 | European Pat. Off. . |
| 0435514 | 7/1991 | European Pat. Off. . |
| 4130352 | 3/1993 | Germany . |
| WO 89/02448 | 3/1989 | WIPO . |

*Primary Examiner*—David W. Wu
*Attorney, Agent, or Firm*—Sherman and Shalloway

[57] ABSTRACT

In a gas phase olefin polymerization, an olefin is continuously fed to a fluid bed reactor in which a metallocene catalyst is present. At least one compound selected from water, alcohols and ketones is added in a specified amount simultaneously with the feeding of the olefin. Thus, an olefin polymer having a satisfactory drop second count index as defined by the below indicated formula is produced:

$$X = \frac{t}{t_o} \times 100$$

wherein $t_o$ and $t$ respectively represent a flow time measured in the flow test according to ASTM D-1775 of the olefin polymer obtained when none of the water, alcohols and ketones is incorporated in the reactor, and when at least one compound of water, alcohols and ketones is incorporated in the reactor. The flowability of the polymer formed in the reactor is excellent, so that blocking, bridging and the like do not occur during the gas phase polymerization. Thus, it is feasible to stably produce a (co)polymer having excellent particle properties in high yield for a prolonged period of time.

29 Claims, 2 Drawing Sheets

PROCESS FOR GAS PHASE POLYMERIZATION OF OLEFIN

FIELD OF THE INVENTION

The present invention relates to a process for gas phase polymerization of an olefin. More particularly, the present invention is concerned with a process for gas phase polymerization of an olefin, in which the olefin is continuously polymerized in the gas phase in a fluidized bed reactor having a metallocene catalyst placed therein to obtain an olefin (co)polymer whose flowability is so excellent that blocking, bridging and the like do not occur in the fluidized bed to thereby ensure stable production of the olefin (co) polymer for a prolonged period of time.

BACKGROUND OF THE INVENTION

Olefin polymers, representative examples thereof including polyethylene and linear low-density polyethylene (LLDPE) which is a copolymer of ethylene and an α-olefin, are now being widely employed as materials for forming films.

Such olefin polymers have conventionally been produced by (co)polymerizing an olefin in the presence of a catalyst containing a solid titanium catalyst component comprising magnesium, titanium and halogen as essential components (hereinafter often referred to as "titanium catalyst") according to any of the solution polymerization, suspension polymerization and gas phase polymerization techniques.

When the above polymerization is conducted according to the gas phase polymerization technique, particulate polymers can be obtained, so that particle precipitation and particle separation steps after the polymerization become unnecessary. Therefore, the gas phase polymerization process can accomplish process simplification and energy saving to thereby lower production cost.

This gas phase polymerization process is a process for continuously (co)polymerizing an olefin, in which a solid catalyst and an olefin are continuously fed into a fluidized bed reactor to thereby polymerize or copolymerize the olefin in the fluidized bed and the thus obtained particulate polymer is continuously withdrawn.

In order to ensure stable and continuous production of a particulate polymer according to the gas phase polymerization process, the reaction conditions and the flowability and mixing conditions of charged materials and product (olefin polymer) must be stabilized for a prolonged period of time in the fluidized bed reactor into which the catalyst and olefin are fed, in which the particulate polymer is formed, and from which the particulate polymer is continuously discharged.

In recent years, a catalyst (hereinafter often referred to as "metallocene catalyst") comprising a solid catalyst component containing a metallocene compound which contains a Group IVB metal, such as iron, titanium, zirconium and hafnium, as a central atom, and an organoaluminum component was developed as a catalyst highly active in the gas phase polymerization of olefins. The metallocene catalyst is so highly active that not only is the polymer production per catalyst large but also the properties of the activity points are uniform with the result that there is less formation of such as low-molecular weight by-products, by-products containing a high content of comonomers and highly sticky by-products. Thus, a homogeneous polymer can be obtained which has low stickiness and narrow molecular weight distribution.

However, the metallocene catalyst has a drawback in that when, for example, ethylene and an α-olefin are copolymerized to form a linear low-density polyethylene (LLDPE) in the presence of the metallocene catalyst for a prolonged period of time, the flowability of polymer particles in the fluid bed reactor is lowered for various reasons with the result that it becomes unfeasible to maintain a homogeneous mixing condition of the catalyst, materials and formed polymer. This condition would occasionally cause polymer particles to mutually adhere to result in blocking or bridging, and further would cause polymer particles to adhere to the inner wall, gas distributor plate, etc. of the reactor to form sheet polymers, which would clog the gas distributor plate to thereby render operation stopping inevitable.

Moreover, the olefin (co)polymer having poor flowability in the fluidized bed reactor also exhibits poor flowability after discharge outside the fluidized bed reactor, so that there has been the danger that blocking or bridging occurs in the olefin (co)polymer discharge device and dryer to thereby obstruct a smooth discharge of the (co)polymer.

Processes in which, using titanium and other Ziegler-Natta catalysts, the gas phase polymerization for obtaining an olefin polymer can be stably performed for a prolonged period of time without the occurrence of agglomeration and adherence to the reactor wall of olefin polymer particles in the fluidized bed reactor are disclosed in specifications including EP-A-376,559, EP-A-359,444 and E-PA-366,823.

The inventor has made extensive and intensive investigations and studies with a view toward developing a process ensuring stable, continuous gas phase polymerization of olefins in the presence of a highly active metallocene catalyst for a prolonged period of time. As a result, it has been found that a gas phase polymerization in the presence of at least one compound selected from the group consisting of water, alcohols and ketones in a specific amount relative to the total (gram atom) of the organoaluminum oxy compound and organoaluminum compound as catalyst components in a fluidized bed reactor, ensures stable retention of the flowability of olefin (co)polymer particles, in the fluidized bed reactor for a prolonged period of time, even when the olefin (co)polymer is LLDPE or the like. Thus, it has been found that the above gas phase polymerization permits long-term continuous operation by which an olefin (co) polymer having an excellent flowability can be obtained. The present invention has been completed on the basis of the above finding.

OBJECT OF THE INVENTION

The object of the present invention is to provide a process for gas phase polymerization of an olefin, in which, in the production of LLDPE or the like as well, the flowability in the fluidized bed reactor is excellent to thereby prevent blocking and bridging, so that an olefin (co)polymer having excellent particle properties can be stably produced in high yield for a prolonged period of time.

SUMMARY OF THE INVENTION

The process for polymerizing an olefin in the gas phase according to the present invention comprises continuously feeding an olefin into a fluidized bed reactor in which a solid Group IVB metallocene catalyst comprising a Group IVB transition metal compound containing a ligand having a cyclopentadienyl skeleton, an organoaluminum oxy compound and, optionally, an organoaluminum compound is present, and simultaneously adding at least one compound selected from the group consisting of water, alcohols and ketones in an amount of 0.1 to 3 mol/1 gram atom relative to the total (gram atom) of aluminum contained in the organoaluminum oxy compound and the organoaluminum compound so as to polymerize or copolymerize the olefin, thereby obtaining an olefin polymer having a drop second count index X defined by the following numerical formula of 95 or less, $$X = \frac{t}{t_o} \times 100$$

wherein $t_0$ represents a flow time measured in the dry flow test according to ASTM D-1775 of the olefin polymer obtained when none of the water, alcohols and ketones is incorporated in the reactor, and t represents a flow time measured in the dry flow test according to ASTM D-1775 of the olefin polymer obtained when at least one compound selected from the group consisting of water, alcohols and ketones is incorporated in the reactor.

The temperature variation in the above fluidized bed can be controlled within 5° C. by the feeding into the fluidized bed reactor of at least one compound selected from the group consisting of water, alcohols and ketones.

In the present invention, it is preferred that ethylene and an α-olefin having 3 to 18 carbon atoms be copolymerized to produce a linear low-density polyethylene (LLDPE).

DETAILED DESCRIPTION OF THE INVENTION

The process for gas phase polymerization of an olefin according to the present invention will now be described in greater detail.

The term "polymerization" used herein may mean not only homopolymerization but also both of homopolymerization and copolymerization. Further, the term "polymer" used herein may mean not only homopolymer but also both homopolymer and copolymer.

First, the solid Group IVB metallocene catalyst to be used in the process for gas phase polymerization of an olefin according to the present invention will be described.

The solid Group IVB metallocene catalyst to be used in the present invention comprises:

[A] a Group IVB transition metal compound containing a ligand having a cyclopentadienyl skeleton,

[B] an organoaluminum oxy compound, and

[C] a particulate carrier.

[A] the Group IVB transition metal compound containing a ligand having a cyclopentadienyl skeleton (hereinafter often referred to as "metallocene compound [A]") is a compound concretely represented by the formula [I]

$ML_x$ [I]

wherein M is a Group IVB transition metal selected from the group consisting of Zr, Ti and Hf; L is a ligand coordinating to the transition metal, at least one of L is a ligand having a cyclopentadienyl skeleton, L other than the ligand having a cyclopentadienyl skeleton is a hydrocarbon group of 1–12 carbon atoms, an alkoxy group, an aryloxy group, trialkylsilyl group, $SO_3R$ (wherein R is a hydrocarbon group of 1 to 8 carbon atoms which may have a substituent such as halogen), halogen atom or hydrogen atom, and x is a valence of the transition metal.

The ligands having a cyclopentadienyl skeleton include, for example, cyclopentadienyl; alkyl-substituted cyclopentadienyl groups such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl, and hexylcyclopentadienyl; and an indenyl group, 4,5,6,7-tetrahydroindenyl group and a fluorenyl group. These groups may be substituted by a halogen atom or trialkylsilyl group.

Of these ligands coordinating to the transition metal, the alkyl-substituted cyclopentadienyl groups are most preferred.

When the compound represented by the above formula contains two or more ligands having a cyclopentadienyl skeleton, two ligands having a cyclopentadienyl skeleton may be bonded together via an alkylene group such as ethylene and propylene, a substituted alkylene group such as isopropylidene and diphenylmethylene, a silylene group or a substituted silylene group such as dimethylsilylene, diphenylsilylene and methylphenylsilylene.

Following ligands may be exemplified as the ligand other than those having a cyclopentadienyl skeleton.

The hydrocarbon group having 1–12 carbon atoms includes, for example, alkyl, cycloalkyl, aryl and aralkyl;

the alkyl group includes methyl, ethyl, propyl, isopropyl and butyl;

the cycloalkyl group includes, for example, cyclopentyl and cyclohexyl;

the aryl group includes, for example, phenyl and tolyl; and the aralkyl group includes, for example, benzyl and neophyl.

The alkoxy group includes, for example, methoxy, ethoxy and butoxy;

the aryloxy group includes, for example, phenoxy; and the halogen includes, for example, fluorine, chlorine, bromine and iodine.

The ligand represented by $SO_3R$ includes, for example, p-toluenesulfonate, methanesulfonate and trifluoromethanesulfonate.

When the transition metal has a valence of 4, the metallocene compound [A] containing ligands having a cyclopentadienyl skeleton may be represented more concretely by the formula [I']:

$R^1_a R^2_b R^3_c R^4_d M$ [I']

wherein M is an above mentioned transition metal, $R^1$ is a group (ligand) having a cyclopentadienyl skeleton, $R^2$, $R^3$ and $R^4$ are each a group having a cyclopentadienyl skeleton, an alkyl group, cycloalkyl group, aryl group, aralkyl group, alkoxy group, aryloxy group, trialkylsilyl group, $SO_3R$ group, halogen atom or hydrogen atom, a is an integer of at least 1, and a+b+c+d=4.

In the present invention, preferred is a metallocene compound of the formula [I'], in which at least two of $R^1$, $R^2$, $R^3$ and $R^4$, for example, $R^1$ and $R^2$ are each a group having a cyclopentadienyl skeleton.

These groups having a cyclopentadienyl skeleton may be bonded to each other via an alkylene group such as ethylene and propylene, a substituted alkylene group such as isopropylidene, diphenylmethylene, a silylene group or a substituted silylene group such as dimethylsilylene, diphenylsilylene and methylphenylsilylene.

Also, $R^3$ and $R^4$ may be each a group having a cyclopentadienyl skeleton, an alkyl group, cycloalkyl group, aryl group, aralkyl group, alkoxy group, aryloxy group, trialkylsilyl group, $SO_3R$, halogen atom or hydrogen atom.

Listed below are typical representatives of the transition metal compounds in which M is zirconium.

Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethyl zirconium,
Ethylenebis(indenyl)diphenyl zirconium,
Ethylenebis(indenyl)methyl zirconium monochloride,
Ethylenebis(indenyl)zirconium bis(mehtanesulfonate),
Ethylenebis(indenyl)zirconium bis(p-toluenesulfonate),
Ethylenebis(indenyl)zirconium bis (trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl) zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl) zirconium dichloride,
Dimethylsilylenebis(trimethylcyclopentadienyl) zirconium dichloride,
Dimethylsilylenebis(indenyl)zirconium dichloride,
Dimethylsilylenebis(indenyl)zirconium bis (trifluoromethanesulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(cyclopentadienyl)zirconium monochloride monohydride,
Bis(cyclopentadienyl)methyl zirconium monohydride,
Bis(cyclopentadienyl)dimethyl zirconium,
Bis(cyclopentadienyl)diphenyl zirconium,
Bis(cyclopentadienyl)dibenzyl zirconium,
Bis(cyclopentadienyl)zirconium methoxy chloride,
Bis(cyclopentadienyl)zirconium ethoxy chloride,
Bis(cyclopentadienyl)zirconium bis(mehtanesulfonate),
Bis(cyclopentadienyl)zirconium bis(p-toluenesulfonate),
Bis(cyclopentadienyl)zirconium bis (trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis (trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis (mehtanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride In the above-mentioned metallocene compounds, the di-substituted cyclopentadienyl groups include 1,2- and 1,3- substituted groups, and the tri-substituted cyclopentadienyl groups include 1,2,3- and 1,2,4-substituted groups. Also the alkyl groups such as propyl and butyl include n-, i-, sec- and tert-isomers.

There may also be used transition metal compounds wherein the zirconium metal in the above-exemplified zirconium compounds is replaced with titanium or hafnium.

These compounds may be used alone or in combination of two or more. Further, those compounds may be used after diluted in hydrocarbon or halogenated hydrocarbon.

In the present invention, the zirconocene compound containing zirconium as a transition metal and at least two of ligands each having a cyclopentadienyl skeleton is preferably used as the metallocene compound [A].

The conventional aluminoxane and benzene-insoluble aluminum oxy compounds disclosed in Japanese Patent Laid-open Publication No. 2 (1990)-276807 may be used as the organoaluminum oxy compound [B] in the present invention.

The conventional aluminoxane may be prepared, for example, by the following methods using an organoaluminum compound [B-2] mentioned below.

(1) A method wherein a suspension of a compound containing adsorbed water or salt containing water of crystallization, for example, magnesiumchloride hydrate, copper sulfate hydrate, aluminum sulfate hydrate, nickel sulfate hydrate and ceriun (I) chloride hydrate, in a hydrocarbon solvent is allowed to react with an organoaluminum compound such as trialkylaluminum, and the desired aluminoxane is recovered as a hydrocarbon solution containing the same.

(2) A method wherein an organoaluminum compound such as trialkylaluminum is treated directly with water, ice or water vapor in such solvent as benzene, toluene, ethyl ether or tetrahydrofuran, and the desired aluminoxane is recovered as a hydrocarbon solution containing the same.

(3) A method wherein an organoaluminum compound such as trialkylaluminum is allowed to react with an organotin oxide in a solvent such as decane, benzene or toluene.

From the above-mentioned solution containing aluminoxane as recovered, the solvent or unaltered organoaluminum compound is removed by distillation, and the remaining aluminoxane may dissolved again in a solvent.

The organoaluminum oxy compound [B] suitable for use in the present invention may contain a small amount of nonaluminum metal components.

The above organoaluminum oxy compound [B] is generally used in an amount of 5 to 1000 mol, preferably 10 to 400 mol per 1 mol of the solid metallocene catalyst (in terms of transition metal atom).

Examples of the metals employable for the particulate carrier in the invention include organic carrier compounds such as $SiO_2$, $Al_2O_3$, $B_2O_3$, MgO, $ZrO_2$, CaO, $TiO_2$, ZnO, $SnO_2$, BaO and ThO; and resins such as polyethylene, polypropylene, poly-1-butene, poly-4-methyl-1-pentene and a styrene/divinylbenzene copolymer. Among the above-mentioned compounds, preferably used is $SiO_2$. These carrier compounds may be used in combination of two or more kinds.

The solid Group IVB metallocene catalyst to be used in the present invention may be prepared from [A] the metallocene compound, [B] the organoaluminum oxy compound, and [C] the particulate carrier according to the customary procedure.

In the preparation of the solid Group IVB metallocene catalyst, [A] the metallocene compound (in terms of transition metal atom) and [B] the organoaluminum oxy compound are used in respective amounts of generally 0.001 to 1.0 mmol, preferably 0.01 to 0.5 mmol and generally 0.1 to 100 mmol, preferably 0.5 to 20 mmol per 1 g of [C] the particulate carrier.

The solid metallocene catalyst suitable for use in the present invention is preferably in the form of particles having a size of 1 to 300 µm, especially 10 to 100 µm.

Further, in the present invention, the solid metallocene catalyst may comprise, if desired, an electron donor, a reaction auxiliary and other components useful for olefin polymerization in addition to the above catalyst components.

The solid metallocene catalyst suitable for use in the present invention may be the above solid metallocene catalyst in which a product of preliminary polymerization of an olefin is contained.

The solid Group IVB metallocene catalyst suitable for use in the present invention is capable of (co)polymerizing an olefin with excellent polymerization activity.

In the present invention, the olefin polymerization is conducted using the above solid metallocene catalyst. The solid metallocene catalyst of the invention may further contain the following organoaluminum compound [B-2]. Moreover, the solid metallocene catalyst component may be used together with the organoaluminum compound [B-2].

The organoaluminum compound contained as the organoaluminum compound [B-2] and also used in preparing the aluminoxane [B] includes concretely trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Among them, there is preferably used trialkylaluminum, more preferably used triethylaluminum and triisobutylaluminum.

Furthermore, the isoprenylaluminum represented by the following general formula may also be used.

$(i-C_4H_9)_x Al_y (C_5H_{10})_z$ wherein x, y and z are each a positive number, and $z \geq 2x$.

These compounds may be used singly or in combination.

The organoaluminum compound [B-2] used in the invention may contain a metal component other than aluminum.

When being contained in the solid metallocene catalyst, the organoaluminum compound [B-2] is used preferably in an amount of 1 to 200 mol, more preferably 2 to 200 mol per 1 mol of the solid metallocene catalyst (in terms of transition metal atom).

While, it is preferred that the above organoaluminum compound [B-2] be used in an amount of generally 1 to 1000 mol, especially 2 to 300 mol per 1 mol of the solid metallocene catalyst (in terms of transition metal atom) when being used together with the solid metallocene catalyst.

In the present invention, the above solid metallocene catalyst may be fed to the reaction system in the form of either solid powder or slurry in a hydrocarbon solvent. As this hydrocarbon solvent, there may be mentioned, for example, nonpolymerizable hydrocarbons described later as being suitable for use as a polymerization solvent. It is preferred that the same solvent be employed as in the polymerization.

In the gas phase polymerization process of the present invention, an olefin is polymerized in the presence of the above catalyst for olefin polymerization.

The process for gas phase polymerization of an olefin according to the present invention will be described in detail with reference to FIG. 1.

The above solid Group IVB metallocene catalyst 1 is fed through a line 2 into a fluidized bed reactor 3.

It is preferred that the solid Group IVB metallocene catalyst 1 be fed at a rate of generally 0.00001 to 1.0 mmol/hr, especially 0.0001 to 0.1 mmol/hr (in terms of the transition metal atom of the metallocene compound [A]) per liter of the volume of the polymerization system.

In the fluid bed reactor 3, for example, a gaseous polymerizable olefin and a nonpolymerizable hydrocarbon fed through a line 9 are blown through a circulating line 6 into a lower part of the fluid bed reactor 3 and then through a gas distributor plate 4, such as that of a porous plate, into a central part thereof by means of a circulating gas blower 7 to thereby keep a fluid bed (reaction system) 5 fluid. The introduced matter beyond the fluidized bed is decelerated in a deceleration zone 3a provided in an upper part of the reactor 3 and recycled through the circulating line 6.

The olefin is blown into the fluidized bed 5 in which the above solid catalyst 1 is kept fluid, and polymerized there to form polymer (olefin (co)polymer) particles. The formed polymer is continuously withdrawn through a line 11 from the fluid bed reactor 3. The polymerization may be performed in at least two stages.

The olefin employed in the present invention is preferably an α-olefin having 2 to 18 carbon atoms, such as ethylene, propylene, 1-butene, 1-pentene, 1-hexene, 4-methyl-1-pentene, 3-methyl-1-pentene, 1-heptene, 1-octene, 1-nonene, 1-decene, 1-undecene, 1-dodecene, 1-tetradecene, 1-hexadecene and 1-octadecene.

Further, examples of such olefins include cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, styrene and vinylcyclohexane.

In the polymerization, the above olefins may be homopolymerized or copolymerized.

The olefins may be copolymerized with a polyene, such as butadiene, isoprene, 1,4-hexadiene, dicyclopentadiene and 5-ethylidene-2-norbornene.

In the present invention, it is preferred that ethylene and an α-olefin having 3 to 18 carbon atoms be copolymerized to produce a linear low-density polyethylene (LLDPE).

In the polymerization, a nonpolymerizable hydrocarbon which does not polymerize under the olefin polymerization conditions and a polymerization-inert gas, such as nitrogen gas, may be coexistent, and the coexistence of the nonpolymerizable hydrocarbon is preferred.

In the present invention, highly volatile, nonpolymerizable hydrocarbons having low boiling points are preferably used as the above nonpolymerizable hydrocarbon. The above nonpolymerizable hydrocarbons having low boiling points are preferably those which can easily be condensed at low temperatures, for example, easily liquefied by conventional coolants, such as water, in a condenser (not shown) provided on the circulating line 6. Examples of such nonpolymerizable hydrocarbons having low boiling points include saturated hydrocarbons, such as propane, n-butane, i-butane, n-pentane, i-pentane and cyclopentane. Of these, propane is most preferred. The above hydrocarbons may be used either singly or in combination.

In the polymerization, the olefin and nonpolymerizable hydrocarbon are generally gaseous and fed at a rate such that the reaction system 5 is kept fluid. In particular, they are generally fed at a rate of about 1.5 to 20 $U_{mf}$, preferably about 2 to 10 $U_{mf}$, provided that $U_{mf}$ means the minimum fluidization rate.

In the present invention, the fluidized bed (reaction system) 5 can be agitated by mechanical means, which include various types of agitators, such as anchor-type, screw-type and ribbon-type agitators.

If desired, a molecular weight regulator such as hydrogen can be employed in the polymerization. It may be fed at any part of the fluid bed reactor 3, for example, through line 9.

The polymerization is conducted at a pressure which varies depending on the fluid conditions of the olefin to be polymerized and fluidized bed (reaction system) 5 but is generally in the range of 1 to 100 Kg/cm$^2$, preferably 2 to 40 Kg/cm$^2$.

In the present invention, at least one compound selected from the group consisting of water, alcohols and ketones is fed into the fluidized bed reactor 3, together with the olefin. The feeding of at least one compound selected from the group consisting of water, alcohols and ketones into the fluidized bed reactor minimizes the temperature deviation from the predetermined temperature in the fluid bed 5. The temperature deviation can be kept within ±5° C., preferably within ±3° C.

Alcohols each having 1 to about 18 carbon atoms can suitably be used as the above alcohol, which include, for example, methanol, ethanol, isopropanol, n-propanol, tert-butanol, n-hexanol, n-octanol, n-dodecanol, oleyl alcohol, ethylene glycol, propylene glycol, diethylene glycol, methoxy ethanol, cyclohexanol, benzyl alcohol, isopropylbenzyl alcohol and phenylethyl alcohol.

Examples of the ketones include acetone, methyl ethyl ketone, methyl n-propyl ketone, diethyl ketone, 2-hexanone, 3-hexanone, methyl t-butyl ketone, di-n-propyl ketone, diisopropyl ketone, diisobutyl ketone, chloroacetone and acetylacetone.

Of the above compounds, alcohols, especially alcohols each having 1 to 10 carbon atoms, still especially methanol and ethanol, are preferred. The above compounds may be used either singly or in combination.

The above at least one compound selected from the group consisting of water, alcohols and ketones may either be fed into the fluidized bed reactor 3 through the line 10 and then the circulating line 6, or may be previously mixed with the gaseous olefin to be polymerized or the inert gas and fed into the reactor through the line 9.

At least one compound selected from the group consisting of water, alcohols and ketones is fed in an amount of 0.1 to 3 mol/1 gram atom, preferably 0.1 to 2 mol/1 gram atom, still preferably 0.1 to 1.5 mol/1 gram atom, especially 0.25 to 1.5 mol/1 gram atom relative to the total (gram atom) of aluminum contained in the organoaluminum oxy compound and organoaluminum compound contained in the solid metallocene catalyst.

In the present invention, the amount of at least one of water, alcohols and ketones relative to the olefin fed into the reactor is not limited. However, it is preferred that at least one compound selected from the group consisting of water, alcohols and ketones be fed in an amount of 0.1 to 400 μmol, especially 1 to 300 μmol, still especially 2 to 200 μmol per mol of the olefin fed into the fluid bed reactor.

Further, it is preferred that at least one compound selected from the group consisting of water, alcohols and ketones be fed in an amount of 1 to 1000 mol, especially 5 to 750 mol, still especially 10 to 500 mol per gram atom of the Zr and other metals contained in the solid metallocene catalyst.

Preferably, at least one compound selected from the group consisting of water, alcohols and ketones is continuously fed into the fluid bed reactor 3.

As long as the temperature of the fluid bed 5 is kept constant as mentioned above, the (co)polymerization according to the present invention may be carried out at 20° to 130° C., preferably 50° to 120° C., still preferably 60° to 100° C.

The olefin polymer particles produced by the above polymerization are withdrawn through the line 11. On the other hand, the unreacted gas and the inert gas such as the nonpolymerizable hydrocarbon are decelerated in the deceleration zone 3a beyond the fluidized bed 5 and discharged outside the fluidized bed reactor 3. The discharged gas is passed through a heat exchanger 8 in which the polymerization heat is removed, and recycled through the circulating line 6 into the fluidized bed 5.

The above process of the present invention produces olefin (co)polymer particles having a high bulk density in the fluidized bed. The polymer particles exhibit a shorter flow time measured in the flow test according to ASTM D-1775 and a smaller repose angle to thereby show excellent fluidity. Therefore, the mixing condition thereof in the fluidized bed is surprisingly excellent. Accordingly, the temperature distribution of the fluid bed is so uniform that an olefin (co)polymer having excellent particle properties can stably be produced in high yield for a prolonged period of time.

As mentioned above, the flowability of the olefin (co) polymer produced in the fluid bed reactor is excellent, so that blocking and bridging by the olefin (co)polymer particles would not occur in a device for discharging the olefin (co)polymer from the reactor, a device for drying the olefin (co)polymer and a hopper used for storing the olefin (co) polymer. Therefore, the handling is highly facilitated.

The thus obtained olefin (co)polymer particles have a drop second count index X defined by the following numerical formula of 95 or less, preferably 90 or less, still preferably 85 or less, $$X = \frac{t}{t_o} \times 100$$

wherein $t_0$ represents the flow time measured in the flow test according to ASTM D-1775 of the olefin polymer obtained when none of the water, alcohols and ketones is incorporated in the reactor, and t represents the flow time measured in the flow test according to ASTM D-1775 of the olefin polymer obtained when at least one compound selected from the group consisting of water, alcohols and ketones is incorporated in the reactor.

The flow time measured in accordance with ASTM D-1895 means the time required for 100 cm³ of polymer particles placed in a conical funnel (as same as the funnel used in ASTM D-1775) to complete their outflow by gravitational fall through a funnel opening having a diameter of 0.95±0.08 cm.

A typical olefin (co)polymer especially preferably produced by the process of the present invention is a lowly crystalline ethylene/a-olefin copolymer known as a linear low-density polyethylene (LLDPE) which comprises 75 to 98% by weight, preferably 80 to 97% by weight of structural units derived from ethylene and 3 to 25% by weight, preferably 3 to 20% by weight of structural units derived from an α-olefin having at least 3 carbon atoms.

In the present invention, the olefin (co)polymer is obtained in the form of spherical particles having an average particle size of generally 100 to 5000 μm, preferably 300 to 3000 μm.

The melt index (MI) and density values of the olefin (co)polymer obtained by the present invention depend on the type of the polymer, but are generally in the respective ranges of 0.001 to 1000 g/10 min and 0.89 to 0.97 g/cm³, preferably 0.01 to 100 g/10 min and 0.90 to 0.95 g/cm³.

The olefin (co)polymer particles have a bulk density of generally at least 0.30 g/cm³, preferably at least 0.40 g/cm³.

EFFECT OF THE INVENTION

As described above, the process of the present invention comprises continuous gas phase polymerization of an olefin in a fluidized bed reactor having a metallocene catalyst placed therein, wherein, together with the olefin, at least one compound selected from the group consisting of water, alcohols and ketones is fed in the above specific amount relative to the total of aluminum contained in the above organoaluminum oxy compound and organoaluminum compound as catalyst components. As a result, the flowability of the olefin polymer formed in the fluidized bed reactor is excellent to thereby prevent blocking and bridging, so that an olefin (co)polymer can be stably produced for a prolonged period of time.

EXAMPLES

The present invention will now be further illustrated with reference to the following Examples, which however should not be construed as limiting the scope of the invention.

In the following Examples, the properties of the obtained olefin (co)polymers were measured as follows.

Bulk Density: measured in accordance with ASTM D-1895.

Flow time: measured by the method described hereinbefore.

Figure 2:
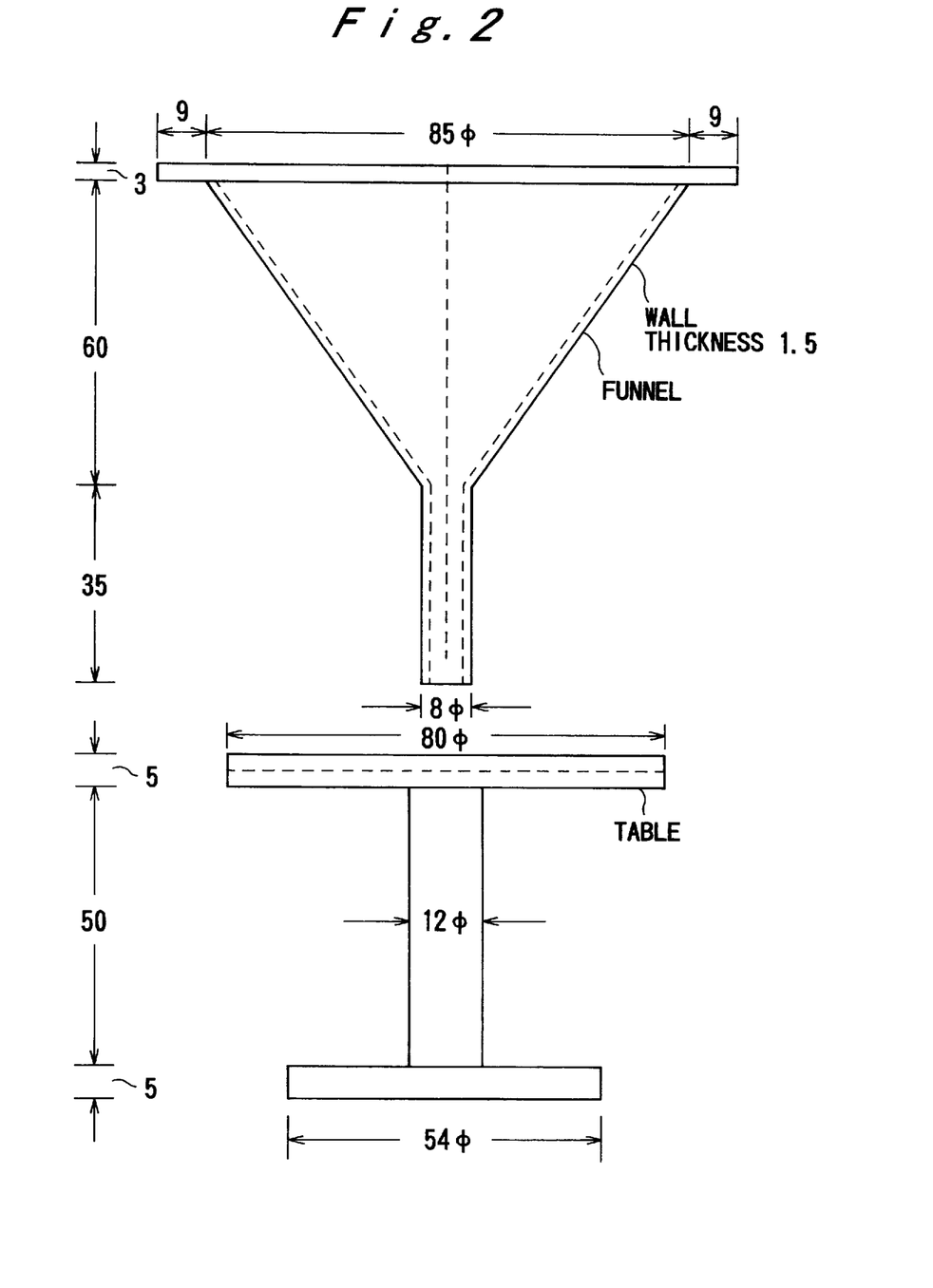
FIG. 2 is an explanatory view for a device employed to measure the angle of repose of polymer particles.

Angle of Repose: measured by the injection method in which olefin (co)polymer particles dried with the use of a drier and cooled to room temperature were put in a glass funnel as illustrated in FIG. 2 and caused to outflow through the same toward a stainless steel table so as to form on the table a conical stack of the particles whose slope, defined as the repose angle, was measured by a protractor.

Example 1

[Preparation of catalyst]

10 kg of silica (SiO₂) dried at 250° C. for 10 hr was suspended in 154 liters of toluene, and cooled to 0° C. Then, 82.0 liters of a toluene solution of methylaluminoxane (Al=1.33 mol/liter) was dropwise added to the suspension over a period of 1 hr, during which the temperature of the mixture was kept at 0° C. The reaction was continued at 0° C. for 30 min, and the temperature of the mixture was elevated to 95° C. over a period of 1.5 hr. At this temperature, the reaction was conducted for 20 hr, and the temperature was lowered to 60° C. The supernatant was removed by decantation. Thus, a solid component was obtained, which was washed twice with toluene and resuspended in 100 liters of toluene.

24.0 liters of a toluene solution of bis(methylbutylcyclopentadienyl)zirconium dichloride (Zr= 27.0 mmol/liter) was dropwise added to the above obtained suspension at 80° C. over a period of 30 min. The reaction was continued at 80° C. for 2 hr. Thereafter, the supernatant was removed, and the residue was washed twice with hexane. Thus, a solid metallocene catalyst containing 5.1 mg of zirconium and 189 mg of aluminum per 1 g of silica was obtained.

The obtained catalyst had good nearly spherical shape. This catalyst was suspended in propane.

[Gas phase polymerization]

Figure 1:
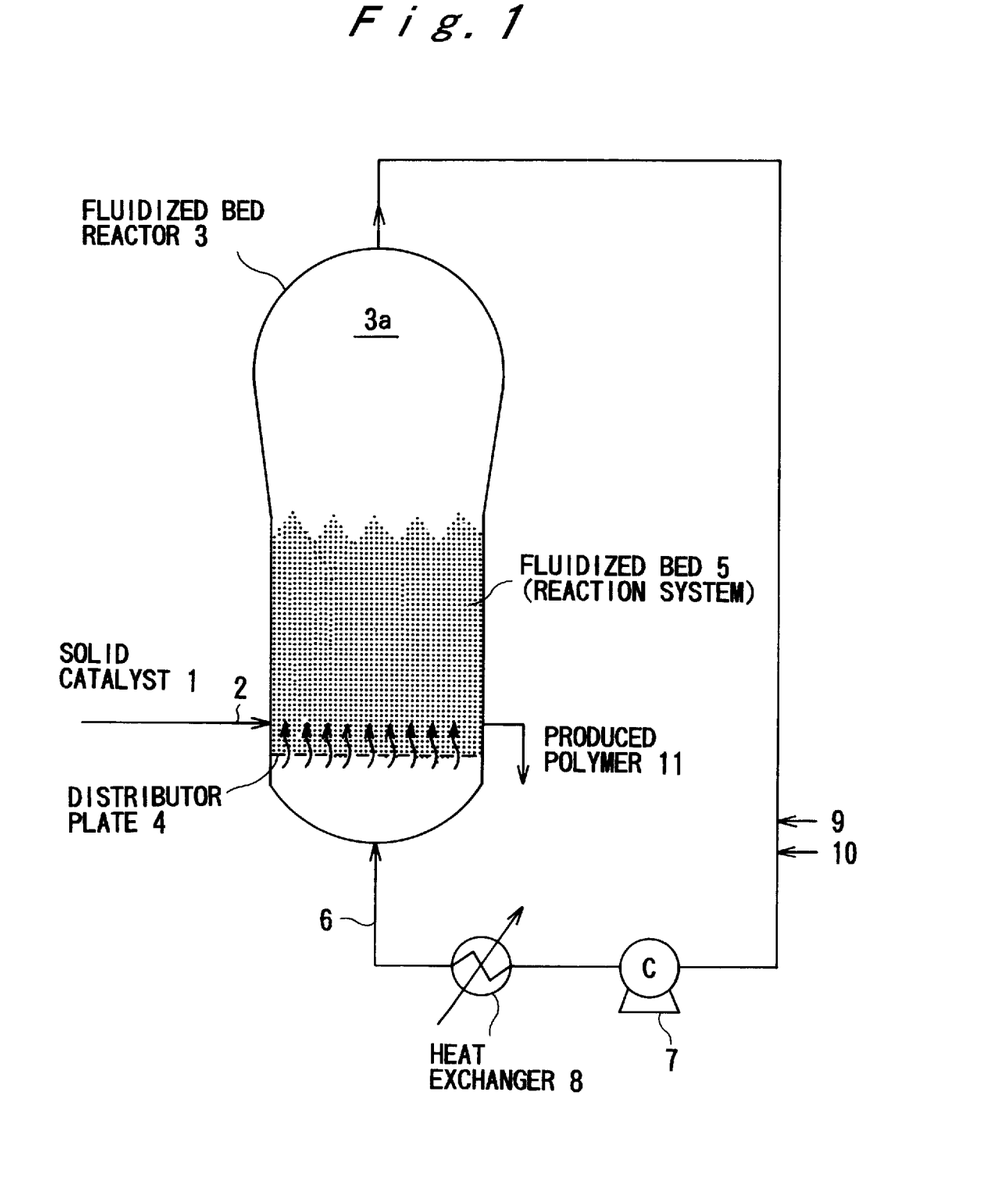
FIG. 1 is a view illustrating the process for gas phase polymerization of an olefin according to the present invention, in which a fluidized bed reactor is used.

Continuous gas phase polymerization of ethylene and 1-hexene was performed in a fluidized bed reactor 3 (continuous polymerization apparatus) as shown in FIG. 1, having a reaction system 5 diameter of 100 cm, a height of 180 cm, a fluidized bed volume of 1400 liters and a maximum deceleration zone 3a diameter of 140 cm.

The above obtained solid catalyst suspension in propane and triisobutylaluminum were continuously fed at respective rates of 1.5 mmol/hr (in terms of Zr atom) and 30 mmol/hr through a line 2 into the fluidized bed 5 of the fluidized bed reactor 3. Further, ethylene, 1-hexene and hydrogen were fed at respective rates of 135 kg/hr, 18 kg/hr and 10 liters/hr through a line 9 into the fluidized bed 5.

Simultaneously, methanol vapor was fed at a constant rate of 0.55 mol (25 ppm relative to ethylene) per gram atom of the whole aluminum through a line 10.

During the polymerization in the gas phase polymerization apparatus, the pressure was kept at 18 kg/cm²G, the polymerization temperature at 80° C., the residence time at 3.0 hr and the linear velocity of the circulating gas for fluidization in the fluidized bed reactor at 60 cm/sec.

In the gas phase polymerization apparatus, the gas composition was 27.5 mol % of ethylene, 0.91 mol % of 1-hexene and 69.1 mol % of propane.

Produced polyethylene (LLDPE) was continuously withdrawn through a line 11 at a rate of 142 kg/hr.

The thus obtained polyethylene had a melt index (MI) of 1.9 g/10 min, a density of 0.908 g/cm$^3$, an average particle size of 830 μm, a bulk specific gravity of 0.47 g/cm$^3$, a flow time of 5.1 sec and a polymer particle repose angle of 33°. It was in the form of highly flowable particles.

Under the above conditions, continuous operation was carried out for 300 hr. The gas phase polymerization apparatus was stable and the discharge of polymer particles from the reactor was smooth, thereby demonstrating the feasibility of extremely stable operation.

The temperature distribution was continuously measured on the inner surface of the fluid bed wall at a total of 16 points consisting of 4 points, any two neighboring points thereof being apart at a central angle of 90°, set at each of the heights 200, 600, 1000 and 1400 mm from the distributor plate in order to monitor the temperatures of the fluid bed interior and fluid bed wall surface. The temperature deviation from the predetermined polymerization temperature was 1 to 2° C., and, under this temperature condition, continuous operation was carried out over a period of at least 300 hr.

The above demonstrates that the temperature uniformity in the fluidized bed reactor was very effectively maintained by virtue of the addition of methanol. Especially, it has been demonstrated that the above process was free from mixing condition deterioration attributed to poor flowability of polymer particles, and that the polymer particles were satisfactorily mixed even in the vicinity of the wall surface of the fluid bed. Thus, the above process is highly advantageous in operation stability over a prolonged period of time and in handling of polymer particles as compared with the process of the following Comparative Example 1.

Comparative Example 1

A gas phase polymerization was performed in the same manner as in Example 1, except that methanol vapor was not fed into the reaction system.

Illustratively, the solid metallocene catalyst obtained in Example 1 and triisobutylaluminum were continuously fed at respective rates of 1.3 mmol/hr (in terms of Zr atom) and 30 mmol/hr through the line 2 into he fluid bed reactor 3 (fluidized bed 5) having the same fluidized bed reaction volume of 1400 liters as in Example 1.

Simultaneously, ethylene, 1-hexene and hydrogen were fed at respective rates of 105 kg/hr, 14 kg/hr and 8 liters/hr through the line 9 into the fluidized bed reactor 3.

During the polymerization in the fluidized bed reactor 3, the pressure was kept at 18 kg/cm$^2$G, the polymerization temperature at 80° C., the residence time at 4.0 hr and the linear velocity of the circulating gas for fluidization in the fluidized bed reactor at 60 cm/sec.

In the fluidized bed reactor, the gas composition containing 27.5 mol % of ethylene, 0.89 mol % of 1-hexene and 69.4 mol % of propane was subjected to gas phase polymerization.

Produced polyethylene was continuously withdrawn through the line 11 at a rate of 111 kg/hr.

The thus obtained polyethylene had an MI of 2.0 g/10 min, a density of 0.909 g/cm$^3$, an average particle size of 820 μm, a bulk specific gravity of 0.46 g/cm$^3$, a flow time of 8.7 sec and a polymer particle repose angle of 41°. The obtained polyethylene particles had substantially the same shape as in Example 1, but the flowability thereof was inferior.

Long-term continuous operation was tested. Trouble occurred in the discharge of polyethylene particles from the fluidized bed and the temperature control of the fluidized bed was unstable as described below. As a result, continuous operation was successful only for 60 hr.

The temperature distribution of the fluidized bed and fluidized bed wall surface was continuously measured by the use of thermometers fitted for monitoring the temperatures of the fluidized bed interior and fluidized bed wall surface in the same manner as in Example 1.

As a result, it was found that the temperature deviation from the predetermined polymerization temperature was 5° to 10° C. in the vicinity of the wall surface, and that there was a marked temperature deviation in the fluidized bed.

The above demonstrates the presence of mixing condition deterioration attributed to polymer adherence or the like in the vicinity of the wall surface of the fluidized bed, which is presumed to obstruct stable operation. Further, the discharged polymer particles have poor flowability, so that their agglomeration causes bridging phenomenon on the bottoms of the polymer particle discharge and hopper devices, thereby bringing about difficulties in the discharge.

Example 2

The same procedure as in Example 1 was repeated except that, in place of methanol, water was continuously fed at a constant rate of 0.28 mol (6.2 ppm relative to ethylene) per gram atom of the whole aluminum through the line 10. In the fluidized bed 5, a temperature variation of 1° to 2° C. from the predetermined polymerization temperature was maintained throughout a continuous operation for 300 hr.

The thus obtained polyethylene had a melt index (MI) of 1.8 g/10 min, a density of 0.909 g/cm$^3$, an average particle size of 820 μm, a bulk specific gravity of 0.47 g/cm$^3$, a flow time of 5.9 sec and a polymer particle repose angle of 35°. It was in the form of highly fluid and desirably shaped spherical particles.

Example 3

The same procedure as in Example 1 was repeated except that the solid catalyst obtained in Example 1 and triisobutylaluminum were continuously fed at respective rates of 1.5 mmol/hr (in terms of Zr atom) and 60 mmol/hr and further, ethylene, 1-hexene and hydrogen were fed at respective rates of 135 kg/hr, 18 kg/hr and 10 liters/hr, and that, in place of methanol, acetone vapor was continuously fed at a constant rate of 0.07 mol (3.7 ppm relative to ethylene) per gram atom of the whole aluminum through the line 10. In the fluidized bed 5, a temperature variation of 1° to 2° C. from the predetermined polymerization temperature was maintained throughout a continuous operation for 300 hr.

The thus obtained polyethylene had a melt index (MI) of 2.1 g/10 min, a density of 0.909 g/cm$^3$, an average particle size of 780 μm, a bulk specific gravity of 0.47 g/cm$^3$, a flow time of 6.2 sec and a polymer particle repose angle of 36°. It was in the form of highly fluid and desirably shaped spherical particles.

What is claimed is:

1. A process for homopolymerizing an olefin or copolymerizing olefins with each other or copolymerizing at least one olefin with a polyene in the gas phase, which comprises continuously feeding an olefin monomer feedstream comprising at least one olefin with or without a polyene into a fluidized bed reactor in which a solid Group IVB metallocene catalyst comprising a Group IVB transition metal compound containing a ligand having a cyclopentadienyl skeleton, an organoaluminum oxy compound and, optionally, an organoaluminum compound, is present, and simultaneously adding at least one compound selected from the group consisting of water, alcohols, and ketones in an amount of 0.1 to 3 mol of the at least one compound relative to the total, in gram atoms, of aluminum contained in the organoaluminum oxy compound and the organoaluminum compound, so as to homopolymerize or copolymerize the olefin monomer feedstream, thereby obtaining an olefin homopolymer or copolymer having a drop second count index X defined by the following numerical formula, of 95 or less, $$X = \frac{t}{t_o} \times 100$$

wherein $t_0$ represents a flow time measured in the dry flow test according to ASTM D-1775 of the olefin homopolymer or copolymer obtained when none of the water, alcohols and ketones is incorporated in the reactor, and t represents a flow time measured in the dry flow according to ASTM D-1775 of the olefin homopolymer or copolymer obtained when at least one of said compound selected from the group consisting of water, alcohols and ketones is incorporated in the reactor.

2. The process for homopolymerizing or copolymerizing at least one olefin in the gas phase as claimed in claim 1, wherein the drop second count index of the olefin homopolymer or copolymer is 90 or less.

3. The process for copolymerizing at least one olefin in the gas phase as claimed in claim 1, wherein the gas phase polymerization is a copolymerization of ethylene and an α-olefin having 3 to 18 carbon atoms.

4. The process for homopolymerizing or copolymerizing an olefin in the gas phase as claimed in claim 1 wherein the amount of said at least one compound which is simultaneously added is from 0.25 to 1.5 mol relative to the total, in gram atoms of aluminum contained in the organoaluminum oxy compound and the organoaluminum compound.

5. The process for homopolymerizing or copolymerizing an olefin in the gas phase as claimed in claim 1, wherein the at least one compound is water.

6. The process for homopolymerizing or copolymerizing an olefin in the gas phase as claimed in claim 1, wherein the at least one compound is an alcohol having from 1 to 10 carbon atoms.

7. The process for homopolymerizing or copolymerizing an olefin in the gas phase as claimed in claim 1, wherein the at least one compound is methanol or ethanol.

8. The process for homopolymerizing or copolymerizing an olefin in the gas phase as claimed in claim 1, wherein the at least one compound is a ketone.

9. The process for homopolymerizing or copolymerizing an olefin in the gas phase as claimed in claim 1, wherein the at least one compound is acetone.

10. The process for homopolymerizing or copolymerizing an olefin in the gas phase as claimed in claim 1 wherein a constant amount of the at least one compound is added during the homopolymerization or copolymerization of the olefin.

11. The process for homopolymerizing or copolymerizing an olefin in the gas phase according to claim 10 wherein the polymerization reaction is carried out at a selected polymerization temperature in the range of from 60° to 100° C., and wherein the constant amount of the at least one compound is selected to maintain the reaction temperature within 3° C. of the selected temperature.

12. A process for continuously producing an olefin homopolymer or copolymer in a fluidized bed reactor which comprises continuously introducing into the reactor, at a constant rate, each of the at least one olefin to be homopolymerized or copolymerized with each other or with a polyene, a solid olefin polymerization catalyst which includes Group IVB metal compound and organolaluminum oxy compound and, optionally, an organoaluminum compound, other than the organoaluminum oxy compound, wherein said Group IVB metal compound consists essentially of at least one Group IVB transition metal metallocene compound containing a ligand having a cyclopentadienyl skeleton, and at least one compound selected from the group consisting of water, alcohols, and ketones in an amount of 0.1 to 3 mol relative to the total amount in gram atoms, of aluminum contained in the organoaluminum oxy compound and the organoaluminum compound, and continuously withdrawing from the fluidized bed reactor said olefin homopolymer or copolymer having a drop second count index X defined by the following numerical formula, of 95 or less, $$X = \frac{t}{t_o} \times 100$$

wherein $t_0$ represents a flow time measured in the dry flow test according to ASTM D-1775 of the olefin homopolymer or copolymer obtained when none of the water, alcohols and ketones is incorporated in the reactor, and t represents a flow time measured in the dry flow according to ASTM D-1775 of the olefin homopolymer or copolymer obtained when at least one compound selected from the group consisting of water, alcohols and ketones is incorporated in the reactor.

13. The process of claim 12 wherein the drop second count index X of the olefin homopolymer or copolymer withdrawn from the fluidized bed reactor is less than 90.

14. The process of claim 12 which comprises continuously copolymerizing ethylene and an alpha-olefin having 3 to 18 carbon atoms.

15. The process of claim 12 wherein the Group IVB metal compound is introduced into the reactor in the form of solid powder.

16. The process of claim 12 wherein the Group IVB metal compound is introduced into the reactor in the form of a slurry in a nonpolymerizable hydrocarbon solvent.

17. The process of claim 12 which comprises introducing the olefin to be homopolymerized or copolymerized and said at least one compound into a bottom portion of the fluidized bed reactor separated from the polymerization reaction zone by a gas distribution plate and introducing the solid olefin polymerization catalyst into the fluidized bed reactor near the bottom portion of the polymerization reaction zone and above the gas distributor plate.

18. The process of claim 17 wherein the olefin to be homopolymerized or copolymerized comprises ethylene and an α-olefin having 3 to 18 carbon atoms.

19. The process of claim 18 which comprises introducing the Group IVB metal compound into the reactor in the form of a slurry in a nonpolymerizable hydrocarbon solvent and also introducing the olefin to be homopolymerized or copolymerized together with nonpolymerizable hydrocarbon solvent.

20. The process of claim 12 wherein the amount of said at least one compound is from 0.25 to 1.5 mol relative to the

17 total amount in gram atom of aluminum contained in the organoaluminum oxy compound and the organoaluminum compound.

21. The process of claim 12 wherein the amount of said at least one compound is in the range of from 2 to 200 micromol per mol of olefin to be polymerized.

22. The process of claim 1 wherein the amount of said at least one compound is in the range of from 2 to 200 micromol per mol of olefin to be homopolymerized or copolymerized.

23. A process for homopolymerizing or copolymerizing an olefin monomer feedstream comprising at least one olefin and, optionally, a polyene in the gas phase, which comprises
continuously introducing said olefin monomer feedstream into a fluidized bed reactor;
continuously introducing olefin polymerization components, including solid Group IVB metallocene catalyst comprising a Group IVB transition metal compound containing a ligand having a cyclopentadienyl skeleton, an organoaluminum oxy compound and, optionally, an organoaluminum compound, into the fluidized bed reactor;
determining the total amount of aluminum, in gram atoms, based on the organoaluminum oxy compound and organoaluminum compound, being continuously introduced into the fluidized bed reactor;
continuously introducing into the fluidized bed reactor from 0.1 to 3 mol, per gram atom of the determined total amount of aluminum in the organoaluminum oxy compound and organoaluminum compound being introduced into the fluidized bed reactor, of at least one oxygen containing compound selected from the group consisting of water, alcohols, and ketones; and,
allowing the olefin to homopolymerize or copolymerize in the fluidized bed reactor in the presence of the olefin polymerization components and said at least one oxygen containing compound to thereby form an olefin homopolymer or copolymer having a drop second count index X defined by the following numerical formula, of 95 or less, $$X = \frac{t}{t_o} \times 100$$

wherein $t_0$ represents a flow time measured in the dry flow test according to ASTM D-1775 of the olefin homopolymer or copolymer obtained when none of said oxygen containing compound is incorporated in the fluidized bed reactor, and t represents a flow time measured in the dry flow according to ASTM D-1775 of the olefin homopolymer or copolymer obtained when at least one of said oxygen containing compound is incorporated in the fluidized bed reactor.

24. The process of claim 23 which comprises continuously introducing into the fluidized bed reactor from 0.25 to 1.5 mol, per gram atom of the determined total amount of aluminum being introduced into the fluidized bed reactor, of said at least one oxygen containing compound.

25. The process of 23 which further comprises maintaining at a constant amount the amount of the said at least one oxygen containing compound being continuously introduced into the fluidized bed reactor.

26. The process of claim 25 which further comprises allowing the olefin to homopolymerize or copolymerize at a selected temperature in the range of from 60° C. to 100° C., and maintaining the constant amount of the said at least one oxygen containing compound at an amount which will maintain the reaction temperature within 3° C. of the selected temperature.

18

27. A process for maintaining a relatively constant temperature during the fluidized bed homopolymerization or copolymerization of an olefin in the presence of a solid olefin polymerization catalyst system consisting essentially of solid Group IVB metallocene catalyst comprising a Group IVB transition metal compound containing a ligand having a cyclopentadienyl skeleton, an organoaluminum oxy compound and, optionally, an organoaluminum compound,
said process comprising,
continuously introducing an olefin monomer feedstream comprising at least one olefin and, optionally, a polyene into a fluidized bed reactor;
continuously introducing the solid olefin polymerization catalyst system into the fluidized bed reactor;
continuously introducing into the fluidized bed reactor from 0.1 to 3 mol, per gram atom of the total amount of aluminum contained in the organoaluminum oxy compound and the organoaluminum compound being introduced into the fluidized bed reactor, of at least one oxygen containing compound selected from the group consisting of water, alcohols, and ketones, effective to maintain the temperature in the fluidized bed reactor at a relatively constant temperature; and,
allowing the olefin to homopolymerize or copolymerize in the fluidized bed reactor in the presence of the solid olefin polymerization catalyst system and said at least one oxygen containing compound at said relatively constant temperature, and whereby there is formed an olefin homopolymer or copolymer having a drop second count index X defined by the following numerical formula, of 95 or less, $$X = \frac{t}{t_o} \times 100$$

wherein $t_0$ represents a flow time measured in the dry flow test according to ASTM D-1775 of the olefin homopolymer or copolymer obtained when none of said oxygen containing compound is incorporated in the fluidized bed reactor, and t represents a flow time measured in the dry flow according to ASTM D-1775 of the olefin homopolymer or copolymer obtained when at least one of said oxygen containing compound is fed into the fluidized bed reactor, and, said olefin homopolymer or copolymer having excellent flowability to allow the olefin homopolymer or copolymer to be stably produced for extended periods of time while effectively inhibit blocking and bridging in the fluidized bed reactor.

28. The process of claim 27 which further comprises selecting a polymerization reaction temperature in the range of from 60° C. to 100° C., and maintaining the constant amount of the said at least one oxygen containing compound at an amount which will maintain the reaction temperature within 3° C. of the selected temperature.

29. The process of any one of claims 1, 12, 23 or 27 wherein the olefin to be homopolymerized or copolymerized comprises at least one olefin selected from the group consisting of ethylene, propylene, 1-butene, and 4-methyl-1-pentene.

* * * * *